US 6,865,686 B1

(12) United States Patent
Krause et al.

(10) Patent No.: US 6,865,686 B1
(45) Date of Patent: Mar. 8, 2005

(54) METHOD FOR SYNCHRONIZING A LOCAL TIME BASE ON A CENTRAL TIME BASE AND DEVICE FOR IMPLEMENTING SAID METHOD WITH PREFERRED APPLICATIONS

(75) Inventors: Karl-Heinz Krause, Nürnberg (DE); Thomas Zebisch, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/647,151

(22) PCT Filed: Mar. 15, 1999

(86) PCT No.: PCT/DE99/00712

§ 371 (c)(1),
(2), (4) Date: Nov. 15, 2000

(87) PCT Pub. No.: WO99/50722

PCT Pub. Date: Oct. 7, 1999

(30) Foreign Application Priority Data

Mar. 27, 1998 (DE) .......................................... 198 13 770
Apr. 7, 1998 (DE) .......................................... 198 15 647

(51) Int. Cl.$^7$ ................................................. G06F 1/14
(52) U.S. Cl. ....................................... 713/400; 713/503
(58) Field of Search ................................. 713/400, 503, 713/600

(56) References Cited

U.S. PATENT DOCUMENTS 4,545,029 A * 10/1985 Collier ........................ 713/503
5,257,404 A    10/1993 Goreham et al.
5,481,258 A     1/1996 Fawcett et al.
5,784,421 A *   7/1998 Dolev et al. ................. 375/354
5,887,029 A *   3/1999 Husted et al. ............... 375/224
5,958,060 A *   9/1999 Premerlani ................... 713/400
6,430,286 B1 *  8/2002 Bhusri ........................ 379/269

FOREIGN PATENT DOCUMENTS

DE          289147 A5     4/1991
DE         4215380 A1    11/1993
DE        19626287 A1     2/1997

OTHER PUBLICATIONS

Patent Abstract of Japan, 07015421, Jan. 17, 1995.
"A Statistical Clock Synchronization Algorithm for Anisotropic Networks", D. Couvet et al., IEEE, pp. 42–51, Sep. 30, 1991.
"Statistical Synchronization Among Participants in Real–Time Multimedia Conference", Panagiotis N. Zarros, et al., IEEE, pp. 912–919, Jun. 12, 1994.

* cited by examiner

Primary Examiner—Dennis M. Butler
(74) Attorney, Agent, or Firm—Harness, Dickey & Pierce, P.L.C.

(57) ABSTRACT

Time messages are transmitted from a central timebase to a local timebase. The transmission time of a time message is detected and is entered as a data value in a subsequent time message. The reception time of a time message is detected, and the transmission time contained in it is reproduced, by the local timebase. Finally, the difference between associated transmission and reception times of time messages is used to determine the time discrepancies occurring in the process, and these are evaluated for synchronization of the local timebase.

19 Claims, 6 Drawing Sheets

METHOD FOR SYNCHRONIZING A LOCAL TIME BASE ON A CENTRAL TIME BASE AND DEVICE FOR IMPLEMENTING SAID METHOD WITH PREFERRED APPLICATIONS

This application is the national phase under 35 U.S.C. § 371 of PCT International Application No. PCT/DE99/00712 which has an International filing date of Mar. 15, 1999, which designated the United States of America.

FIELD OF THE INVENTION

The invention relates to a method for synchronization of at least one local timebase in a local technical system to a central timebase in a central technical system. The invention also relates to an apparatus for carrying out the method, and to preferred uses of the apparatus.

In this case, the local timebase may correspond to the timing in a local data processing device, and the central timebase may correspond to the timing in a central data processing device. Data records are transmitted from the central data processing device to the local data processing device and thus from the central timebase to the local timebase, time base data records contain time information and, in some circumstances, also other payload data of widely differing types. These data records are referred to, for short, as "time messages" in the following text.

BACKGROUND OF THE INVENTION

As a rule, the local processing of data in the local data processing device is carried out on the basis of the local timebase. This is formed in the respective local data processing device in particular by means of so-called timer modules. These are generally counters which are decremented cyclically by a local clock transmitter, emit a trigger or time-transmitter signal for the respective local timebase whenever they are completely decremented, that is to say whenever the counter contents pass through zero.

In automation engineering, local data processing devices may be used for decentralized control of distributed technical equipment which, as a component of a production facility which in some circumstances is complex, impinges, for example, on the machining of a workpiece or the processing of a raw material. By way of example, as one of many possible examples of such technical equipment, electrical drives may be mentioned, which are in each case supplied with data from an associated local data processing device; this may also be referred to as a drive controller. In the example, such data are largely control variables, that is to say, in particular, measured values, set values and settings.

For the operability of the entire production facility, for example a CNC machine tool, it is now generally necessary for the technical equipment of such a facility to act in a coordinated fashion on, for example, a workpiece or a raw material. This is in turn dependent on the local timebases in the local data processing devices of the technical equipment being synchronized to one another. This ensures that, for example, actual values are detected simultaneously by the local data processing devices and, for example, control signals are output simultaneously to the associated technical equipment. All the local data processing devices involved in a production facility thus act at the instant of a corresponding processing state on the respective workpiece or raw material in terms of metrology and control engineering.

Furthermore, regular, renewed synchronization of the local timebases in the local data processing devices is necessary. The reason for this is the associated local, in particular crystal-controlled, clock transmitters in the timer modules. These have different scatters between the units in the various local data processing devices and thus have a different long-term drift behavior. Thus, the local timebases would gradually drift apart from one another without regular synchronization.

In a first, known system, the local data processing devices can be supplied via a separate clock line with a fixed, central control clock for synchronization of the local timebases. This central control clock is supplied directly to the clock transmitter for the respective timer module. Such an arrangement is particularly complex, since the separate clock line must be routed in parallel with a data bus which is generally present in any case and connects the local data processing devices to a central data processing device.

For synchronization of local timebases in local data processing devices, they may also be connected via a data bus to a central data processing unit in which a central database is formed and maintained. In this case, in a known system of this type, so-called "clock messages" are transmitted from the central timebase to the local timebases, where they are evaluated for synchronization. However, a disadvantage that occurs in this case is that the clock messages must be supplied at strictly equidistant times from the central data processing unit to the data bus. These clock messages are received by a specific evaluation circuit in the local data processing devices, in particular by a PLL (phase locked loop) evaluation circuit. This PLL evaluation circuit derives a correction signal from the reception timing of the equidistant clock messages, and this is used to readjust the clock transmitter which acts on the respective timer module, in order to synchronize the local timebase. Synchronization using clock messages at strictly equidistant times is also referred to as hard synchronization.

A major disadvantage with such a system is that separate hardware in the form of an evaluation circuit is required in each local data processing device to receive and evaluate the clock messages which are strictly at equidistant times. A further disadvantage is that, in practice, it is often impossible to comply precisely with the requirement for strictly equidistant timing, for example owing to a particular type of data transmission on the respective data bus or, for example, owing to interrupt-dependent processing delays in the central data processing unit. This leads to fluctuations, in particular delays, in the timing of the clock messages, is also referred to as jitter. In some circumstances, this jitter propagates into the local timebases and can cause equidistant fluctuations in lower-level fine control clocks in the respective local data processing device.

SUMMARY OF THE INVENTION

The invention is based on the object of specifying a method and an apparatus for synchronization of local timebases with as little additional circuit complexity as possible being required at the local data processing device end.

According to the method of the present invention, the transmission time of a so-called "time message" is detected by the central timebase and is entered as a data value in a subsequent time message. The reception time of a time message is then detected, and the value of the transmission time contained in a time message is reproduced by a local timebase. Finally, measured values for the time discrepancy between the local timebase and the central timebase are determined by the local timebase from the difference between associated transmission and reception times of time messages. These time discrepancy values are evaluated for synchronization of the local timebase.

The invention is based on evaluation of the reception of time messages and the use of time information contained in them for synchronization of the local timebases. On the one hand, time stamps are transmitted with the time messages, in particular in the form of the transmission times of previous time messages. However, with regard to the invention, the time messages need in no way be used exclusively for transmission of such time information. In fact, the time messages may furthermore also contain any desired further payload data which is in no way linked to the synchronization of the timebases. The term time message thus expresses the fact that this is a data message which also contains time information which is produced by the central timebase.

Furthermore, the detection of the actual time discrepancies, according to the invention, between the central timebase and local timebase with the aid of time messages makes it possible to compensate for the occurrence of jitter both at the central timebase end, that is to say virtually at the transmission end, and at the local timebase end, that is to say virtually at the reception ends. Such jitter may have widely differing causes and, for example, may be due to transmission interference between the central timebase and the local timebases, or fluctuations in internal processing times in the central timebase or a local timebase, which are dependent on software processes, for example interrupts. The capability to compensate for such fluctuations according to the invention is based on detecting, transmitting and evaluating the values of the respective exact transmission time and of the exact reception time of each time message as accurately as possible is to say it is based on the detection of the time discrepancy associated with them, which discrepancies are in turn a measure of the difference between the central timebase and the local timebase. In this way, a local timebase is supplied with a high-precision and robust time measurement, i.e one that is independent of jitter.

Thus, although the method according to the invention requires regular transmission of time messages, there is no need for clock messages to be transmitted at strictly equidistant times. The time messages are thus data messages which also include time information relating to an exact transmission time. The synchronization method according to the invention is furthermore so robust that, even in an exceptional situation, an individual time message may even be lost without endangering the synchronism of the local timebases.

In a further advantageous embodiment of the method according to the invention, time discrepancies are determined by the local timebase with the aid of a group of time messages which have been transmitted during an observation period. Finally, a correction value is formed from the minimum value of the time discrepancies detected in an observation period, and is used for synchronization. In this embodiment, a group of time messages is thus first of all evaluated at a local timebase end, and the time discrepancies derived from this are effectively, collated. Finally, only that time discrepancy which has the best characteristic is selected for correction. This is the minimum value of the time discrepancies since, specifically, this is linked to a time message which has been subject to the least interference from jitter in the previous observation period, i.e the one which is closest to the ideal state of a virtually undelayed data transmission.

According to a further advantageous embodiment of the method according to the invention, a correction value corresponds to the initial value of a control algorithm, to which the value zero is supplied as the set value, and to which the minimum value of the time discrepancies in an observation period is supplied as the actual value. On the one hand, this embodiment effectively further increases the "softness" of the application of correction values to a local timebase, i.e and in particular application to the timer modules of an associated local data processing unit.

Finally, the use of a control algorithm for determining a correction value makes it possible for the method according to the invention to be implemented virtually completely with the aid of software routines which run in the local data processing unit having the respective local timebase. The respective correction value may thus be determined purely by software then just needs to be loaded as a new start value in the timer module of the local data processing unit. Such a start value may also be referred to a reload value. This is associated with the further advantage that a preferably crystal-operated clock transmitter, which decrements the timer module of a local data processing unit, remains completely uninfluenced, and can run freely. The method according to the invention is thus not applied to the clock transmitter of a timer module, but to the timer module itself. Thus, according to the invention, the local timebase is updated by reprogramming an appropriately selected start value for the timer module. The start value, also called the reload value, is thus dynamically matched. Furthermore, this reprogramming is independent of the clock and can thus be carried out at any time, that is to say "on the fly".

According to a further advantageous embodiment of the invention, a correction value is applied in a distributed manner by a local timebase during a subsequent observation period. This "soft", i.e step-by-step, application of a correction value allows a further reduction to be achieved in the influence of jitter on the synchronization quality. The synchronization method according to the invention is thus highly accurate and does not require any separate clock lines.

The values which are obtained by the evaluation according to the invention of the transmission and reception times of time messages and which are referred to as the "time discrepancy" and are an image of the actual discrepancy between a local timebase and the central timebase. They may thus be used for correction of the local timebase, i.e to synchronize it, without using any associated local clock transmitters. The value of a time discrepancy is in this case governed essentially by two elements, in which case the first element may be regarded as a "drift element" and the second element as a "jitter element". The "drift element" is caused by discrepancies between the central timebase and the local timebase, which are in turn caused by component tolerances, in particular in the generally crystal-operated clock transmitters for the respective timebase. The "jitter element" is essentially caused by different processing times, in particular of the time messages in the central timebase and the local timebase, for example in the respective connections to the data buses of the associated central and local data processing units and, possibly, also by delay time differences, which may be only minor, on the data bus between the data processing units.

BRIEF DESCRIPTION OF THE DRAWINGS

The invention, further advantageous embodiments of it, and further advantages linked to it will be explained in more detail in the following text with reference to the exemplary embodiments which are illustrated in the figures, which are described briefly below and in which.

DETAILED DESCRIPTION OF PREFERRED EMBODIMENTS

Figure 1:
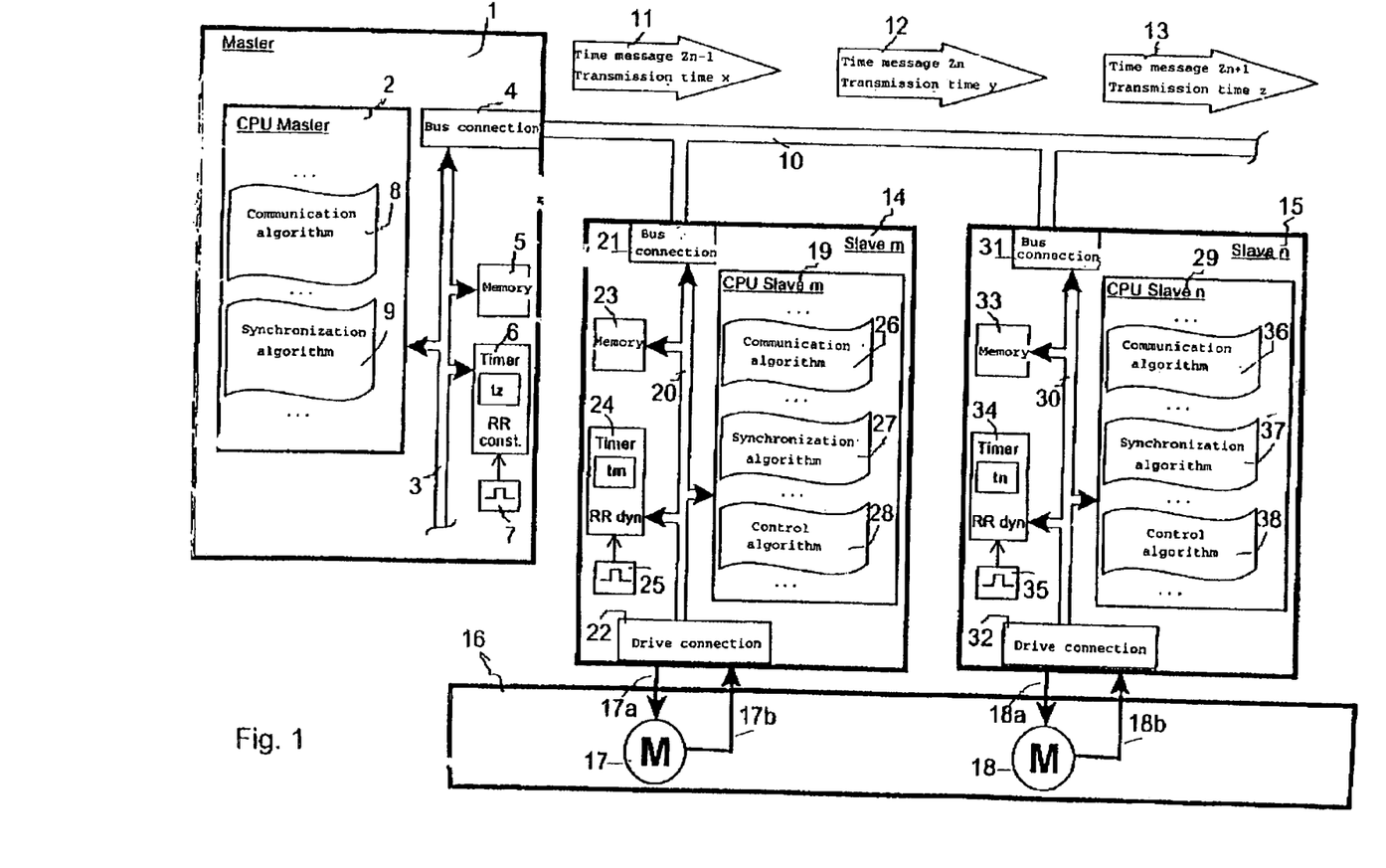
FIG. 1 shows a block diagram of an exemplary arrangement, including a central data processing apparatus and two local data processing apparatuses with a data bus via which time messages are transmitted according to the invention.

FIG. 1 shows an advantageous arrangement, in the form of an example of a block diagram, which is suitable for carrying out the method according to the invention. The arrangement contains a central data processing device 1, which is also referred to as a "master" and, by way of example, two local data processing devices 14 and 15, which are also referred to as the "slave m" and "slave n". All the data processing devices are connected one another via an external data bus 10, wherein data messages are transmitted with time information, that is to say time messages, from the central data processing device 1 to the local data processing devices 14 and 15. In the example in FIG. 1, three successive time messages 11, 12 and 13 are shown by way of example from a stream of messages which follow one another at regular intervals and are also referred to as time messages Zn−1, Zn and Zn+1. As data information, each time message 11, 12, 13 contains the value of the transmission time x, y, z of a previous time message. As has already been explained above, any desired other payload data may also be included, which is not related to the transmission of time information. This will be explained in more detail with reference to the next figure, FIG. 2.

The central data processing device 1 has central device for forming a central timebase tz. This is advantageously a timer module 6, which is actuated by a clock transmitter 7 and, for example, is decremented. The timer module 6 emits a timing signal for the local timebase tz for each complete decrementation, i.e. for each zero crossing of its counter value. The timer module is then once again loaded with a constant start value, which is referred to as "RR const.". The timer module 6 is connected via an internal data bus 3 to other elements in the central data processing device 1. The example in FIG. 1 shows a central processing unit 2, known as the "CPU master", a memory 5 for data and a bus connection 4, via which the internal data bus 3 is connected to the external data bus 10. Apart from a communication algorithm 8 which is processed by the central processing unit 2, the bus connection 4 is a component of a central communication unit. Their task is to feed data messages, in particular in the form of time messages, on to the central data bus 10.

The time messages themselves are formed by a central synchronization device which, in the example in FIG. 1, are represented by a central synchronization algorithm 9, which is likewise processed by the central processing unit 2. Since the transmission time of a time message can no longer be entered in this message itself as a data value, one of the subsequent time messages is used as a medium for this time information. The next time message is preferably used as the medium. Thus, in the method according to the invention, the transmission time of a time message which has been supplied is detected, temporarily stored and entered as a data value in a subsequent time message, before it is fed in. In the examples illustrated in FIGS. 1 to 6, it is assumed that the time message Zn+1 with the reference symbol 13 contains the transmission time z of the preceding time message Zn with the reference symbol 12 as a data value. Further time message Zn with the reference symbol 12 contains the transmission time y of the previous time message Zn−1 with the reference symbol 11 as a data value.

The two local data processing devices 14 and 15 shown by way of example in FIG. 1 are of identical construction and a local unit for forming a local timebase, tm and tn respectively. These local unit preferably respectively include a timer module 24 and 34, which are decremented cyclically by a clock 25 and 35, respectively. A timing signal for the local timebase tm or tn, respectively, is emitted by the timer modules 24 and 34, respectively, for each complete decrementation. The timer modules are then once again loaded with a start value, which is referred to as "RR dyn.". This is a so-called "dynamic reload value" which is formed in accordance with an advantageous embodiment of the invention and which, according to the invention, is matched to the respective local timebase for synchronization, using at least one time discrepancy that has been determined. This will be explained in more detail in the following text.

The timer modules 25 and 35, respectively, are connected via an internal data bus 20 or 30, respectively, to further elements in the respective local data processing device 14 or 15, respectively. In the example in FIG. 1, a local processing unit 19 or 29, respectively, called "CPU Slave m" or "CPU Slave n", respectively, a memory 23 or 33, respectively, for data and a bus connection 21 or 31, respectively, are present via which the respective internal data bus 20 or 30 is connected to the external data bus 10. Apart from a respective communication algorithm 26 or 36, which are respectively processed by the respective local processing unit 19 or 29, the bus connections 21 and 31 are components of a central communication unit. These have the task of receiving time messages from the central data bus 10.

The time messages themselves are evaluated by local synchronization means, which are represented in the example in FIG. 1 by a respective local synchronization algorithm 27 or 37, which is likewise processed by the respective local processing unit 2. According to the invention, the actual reception times of time messages are in this case detected, the transmission times (which are contained in the received time messages as data values) of time messages are read, and the time discrepancies are determined from associated transmission and reception times of time messages. Finally, correction values "RR dyn." are determined from this for the local unit for producing the local timebase tm or tn. If timer modules 24 and 34, respectively, are preferably once again used as local unit or producing the local timebase tm or tn, then the local synchronization algorithms 27 or 37, respectively, apply the correction value "RR dyn." as the start value to the respective timer module. This will be explained in more detail in the following text, in particular with reference to the example in FIG. 6.

In the example in FIG. 1, the respective internal data buses 20 and 30 have a further bus connection, which is designated as a drive connection 22 or 32, respectively. This allows data links to be produced to a technical production facility 16, by way of example. In FIG. 1, the two local data processing devices 14 and 15, respectively, are used, by way of example, to operate local technical equipment 17 or 18, respectively, in the technical production facility 16. The technical equipment includes for example, electrical drives 17 and 18. In this case, the local data processing device 14 or 15, respectively, actuates the local technical equipment 17 or 18, respectively, in time with the respective local timebase tm or tn. In this case, control variables are preferably interchanged in time with the respective local timebase tm or tn between the local data processing device 14 or 14, respectively, and the associated local technical equipment 17 or 18, respectively, in particular digitized actual values, set values and/or settings 17a, 17b and 18a, 18b, respectively. These variables are processed in the decentralized processing unit 28 or 38 [lacuna] local data processing device 14 or 15, respectively. A symbolic control algorithm 28 or 38, respectively, in the local processing unit 19 or 29, respectively, is used by way of example for this purpose in FIG. 1. If the local timebases tm and tn are synchronized according to the invention, then the interchange of the control variables relating to the same initial state takes place in the interior of the production facility 16, and the control algorithms 28 and 38, respectively, complete the respective calculations on the basis of a matching situation.

Figure 2:
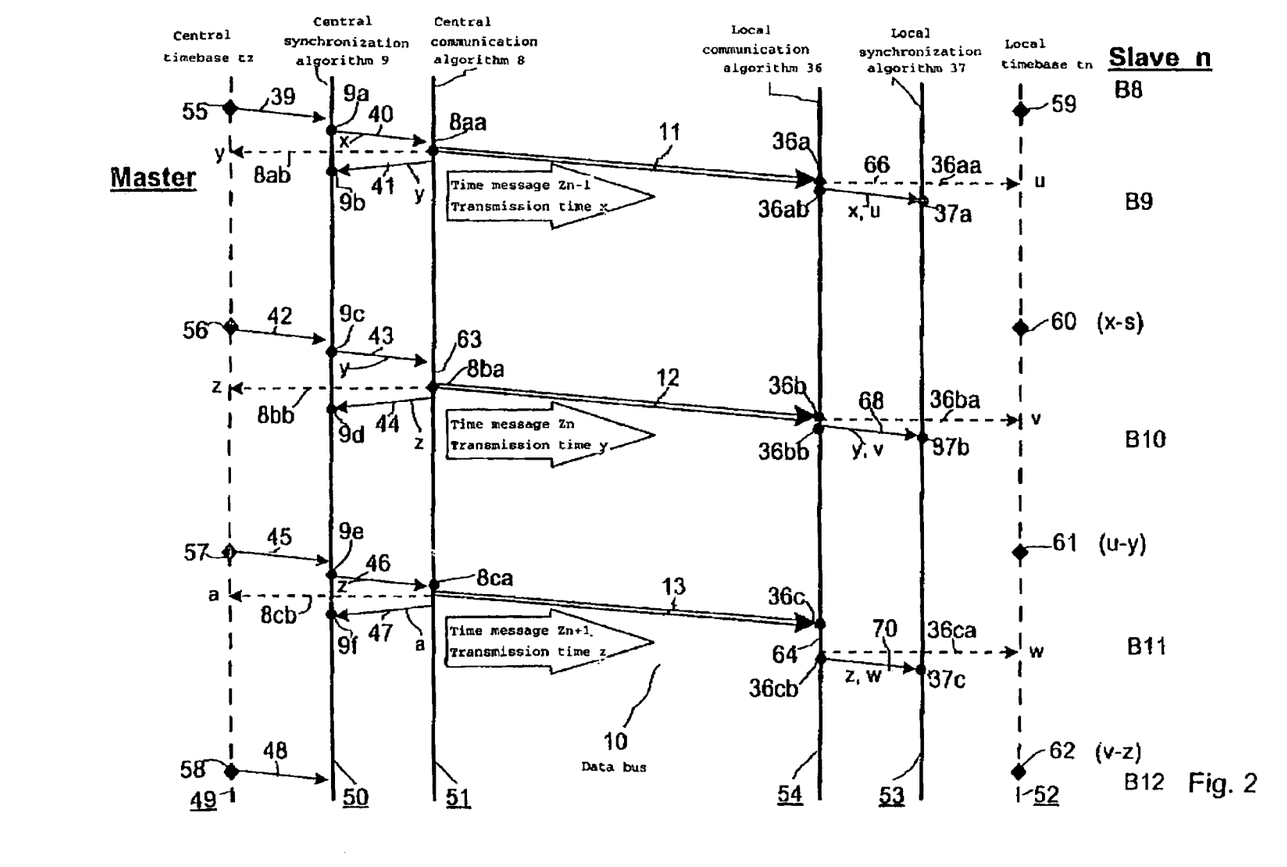
FIG. 2 shows an example of a schematic illustration in the form of a two-dimensional timing diagram to explain the way in which the synchronization method according to the invention operates.

FIG. 2 shows a two-dimensional timing diagram illustrated schematically, by way of example. This will be used in the following text to explain the way in which the synchronization method according to the invention operates.

On the left-hand side of the timing diagram, there is a first group of three vertical time axes 49, 50 and 51, which are associated with the central data processing device 1 (master). In this case, the time axis 49 shows the time profile in the central timebase tz, the time axis 50 shows the action times in the central synchronization algorithm 9, and the time axis 51 shows the data processing steps in the central communication algorithm 8. On the right-hand side of the timing diagram, there is a second group of three further vertical time axes 52, 53 and 54, which are associated with a local data processing device, for example the local data processing device 15 (slave n). In this case, the time axis 52 shows the time profile in the local timebase tn, the time axis 53 shows the action times in the local synchronization algorithm 37, and the time axis 54 shows the data processing steps in the local communication algorithm 36. The transmission of the examples of time messages Zn−1, Zn and Zn+1 on the data bus 10 is symbolized by oblique arrows 11, 12 and 13, running from left to right, between the two groups of time axes.

The sequence of data processing steps and action times for the individual algorithms will be explained in detail in the following text using the example of the timing diagram shown in FIG. 2.

The times 55, 56, 57 and 58 annotated by diamonds on the time axis 49 represent time markers for the central timebase tz. These preferably correspond to those times at which, in the example in FIG. 1, the timer module 6 in the central data processing device 15 is in each case loaded with a new start value, that is to say a reload value RR const. In order to form the central timebase tz, the timer module 6 is decremented cyclically by a clock 7. After each complete decrementation, a timing signal is emitted for the central timebase tz. Finally, a new start value RR const. is applied to the timer module 6. At the same time, the central synchronization algorithm 9 is called up at each of the times 55, 56, 57 and 58, respectively, as is symbolized in FIG. 2 by oblique arrows 39, 42, 45 and 48, respectively, running from left to right. These branch at action times 9a, 9c and 9e of the synchronization algorithm. The action time associated with the arrow 48 is no longer shown on the lower edge of FIG. 2, in order to make the illustration clearer.

At the action times 9a, 9c and 9e, respectively, the temporarily stored transmission time x, y or z, respectively, of the most recently transmitted time message is activated, and is passed on to the central communication algorithm 8. This is once again symbolized by oblique arrows 40, 43 and 46, respectively, running from left to right. This enters the respective transmission time x, y or z in a data processing step 8aa, 8ba or 8ca, respectively, into a time message Zn−1, Zn or Zn+1, respectively, which is then fed into the data bus 10. Preferably after completion of the respective feeding process, the actual transmission time y, z or a, respectively, of the time message Zn−1, Zn or Zn+1 currently being transmitted is detected with respect to the time axis 49 of the central timebase tz in a further data processing step 8ab, 8bb or 8cb, respectively, and is passed on to the central synchronization algorithm 9. This is symbolized by oblique arrows 41, 44 and 47, respectively, which run from right to left and branch at corresponding action times 9b, 9d and 9f, respectively, on the time axis 50 of the central synchronization algorithm 9. The measured values of the actual transmission times y, z and a, respectively, are stored there in order to make it possible to take them into account, after the respective time marked by the time marker 56, 57 or 58, respectively, on the time axis 49 of the central timebase tz, as a data value of the respective subsequent time message Zn, Zn+1 . . . .

The time messages 11, 12 and 13, respectively, fed into the data bus 10 are received in the example in FIG. 2 by the local communication algorithm 36 of the local data processing device 15 (slave n) at the action times 36a, 36b and 36c, respectively. Preferably after completion of the respective data reception process, the actual reception time u, v or w, respectively, of the time message Zn−1, Zn or Zn+1 currently being received is detected with respect to the time axis 52 of the local timebase tn in a further data processing step 36aa, 36ba or 36ca, respectively. Further the respective transmission time x, y or z contained as a data value in the respective time message is reconstructed. Both values, i.e the transmission times of the previous time message and the reception time of the present time message, are available in data processing steps 36ab, 36bb and 36cb. These are passed on in pairs to the local synchronization algorithm 37, as is symbolized by oblique arrows 66, 68 and 70, respectively, which run from left to right and are inscribed x, u; y, v and z, w respectively. These branch at corresponding action times 37a, 37b and 37c on the time axis 53 of the local synchronization algorithm 37. According to the invention, [lacuna] are formed, virtually as measured values for the time discrepancies, from the difference between associated transmission and reception times of time messages in these action times. According to preferred embodiments of the invention, a correction value, or a correction value split into partial correction values, is derived from this for synchronization of the local timebase tn.

A correction value or partial correction value is preferably taken into account actively, or for the purpose of synchronization, at the times 59, 60, 61 and 62, respectively, annotated by diamonds on the time axis 52 of the local timebase tn. In the example in FIG. 2, the associated time discrepancies (x-s), (u-y) and (v-z), which are evaluated as the basis for synchronization, are indicated symbolically alongside the times 60, 61 and 62, respectively.

Furthermore, by way of example, the example in FIG. 2 shows so-called jitter 63 at the transmission end, and so-called jitter 64 at the reception end. These are time delays which occur due to irregular and unpredictable delays in instruction processing at the transmission end, i.e in the processing unit 2 of the central data processing apparatus 1, and at the reception end, for example, in the processing unit 29 of the local data processing apparatus 15. In the example in FIG. 2, the data processing step 8ba is delayed by the jitter 63, i.e the transmission of the time message Zn, on the other hand the transmission of the time messages Zn and Zn+1 in the comparable data processing steps 8aa and 8ca on the time axis 51 of the central communication algorithm 8 takes place with virtually no delay. Furthermore, the data processing step 36cb is delayed by the jitter 64, i.e the reception of the time message Zn+1, on the other hand the reception of the time messages Zn–1 and Zn in the comparable data processing steps 36ab and 36bb on the time axis 54 of the local communication algorithm 36 takes place with virtually no delay. The advantage of the invention is that such sporadic delays have virtually no influence on the quality of the synchronization of the timebases in the local data processing apparatuses. The present value of any jitter is detected, and taken into account in the synchronization as well, by means of the measured value of any time discrepancy.

In one advantageous embodiment of the invention, which has already been illustrated in the example in FIG. 1, the local data processing apparatus 15 may have a local unit for forming the local timebase tn in each case having a timer module 34 which is decremented cyclically by a clock means 35. A timing signal for the local timebase tn is emitted after each complete decrementation. Finally, the local synchronization devices 37 apply a correction value RR dyn, which is formed taking account of measured time discrepancies, as a new start value to the respective timer module 34. This results and in the desired synchronization of the local timebase tn to the central timebase tz. The times 60, 61 and 62, respectively, in FIG. 2 may thus correspond to those times at each of which a new start results. A reload value RR dyn, is loaded in the timer module 34 in the example in FIG. 1. In this case, this start value is not constant, but is dynamically adapted, by evaluation of the detected time discrepancies, for synchronization of the associated timebase tn. One advantageous embodiment of such dynamic adaptation is described in more detail in the following text with reference to the example in FIG. 6.

Figure 3:
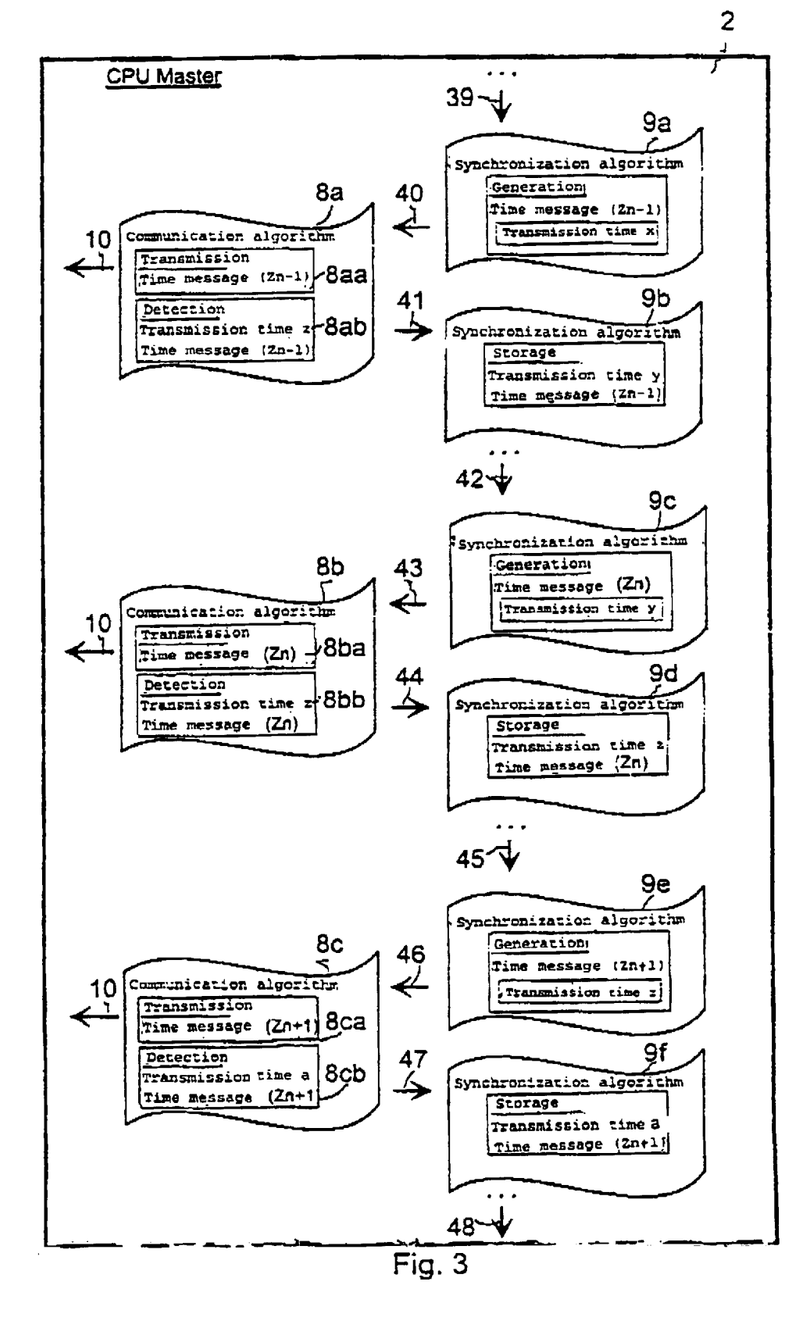
FIG. 3 shows an example of a schematic flowchart to explain the processing steps between the communication algorithm and the synchronization algorithm according to the present invention, at the central data processing apparatus end.
Figure 4:
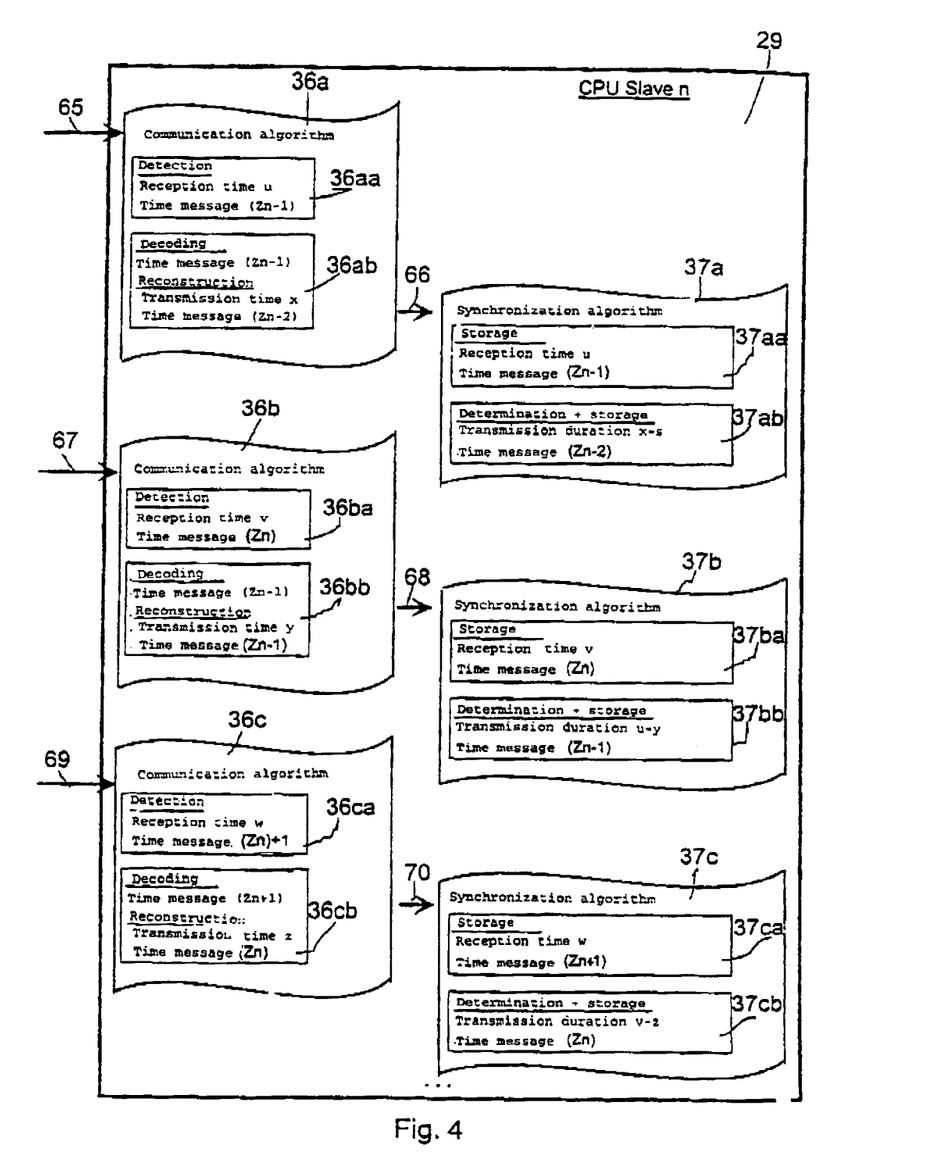
FIG. 4 shows a further example of a schematic flowchart to explain the processing steps between the communication algorithm and the synchronization algorithm according to the present invention, at the local data processing apparatus end.

FIGS. 3 and 4 show examples of schematic flowcharts of the processing steps which occur according to the invention between an associated communication algorithm and synchronization algorithm in a data processing apparatus. The illustrations in the figures serve to explain the timing diagram in FIG. 2 further. In this case, FIG. 3 shows a detail from the processing steps, which occur successively and cyclically according to the present invention, between the central synchronization algorithm 9 and the central communication algorithm 8 at the central data processing apparatus 2 end, i.e in the "CPU master" processing unit in FIG. 2. Furthermore, FIG. 4 shows a detail from the processing steps, which occur successively and cyclically according to the present invention, between the local communication algorithm 36 and the local synchronization algorithm 37 at the local data processing apparatus 15 end, i.e in the "CPU slave n" processing unit in FIG. 2.

In the example in FIG. 3, the central synchronization algorithm 9 is started by the processing step 39 at the action time 9a, so that this algorithm generates a new time message Zn–1, and enters the temporarily stored transmission time x as a data value in this message. The central communication algorithm 8 is started by the following processing step 40 at the action time 8a. This causes the time message Zn–1 to be transmitted to the data bus 10 in the processing step 8aa, and its transmission time y to be detected in the next processing step 8ab. The central synchronization algorithm 9 is started once again by the next processing step 41. This receives the detected transmission time y, for storage purposes. A first sequence of associated processing steps at the central data processing apparatus 2 end is terminated by this processing step. The lower part of FIG. 3 shows two further cycles of processing steps, which relate to the time messages Zn and Zn+1, in an analogous way to the content of FIG. 2. These sequences correspond to the previously explained sequence of processing steps, so that reference can be made to what has been said above with regard to their more detailed description.

In the example in FIG. 4, the local communication algorithm 36 is started at an action time 36a in a processing step 65. This start can be initiated by the arrival of a time message on the data bus. In a processing step 36aa, the local communication algorithm 36 then detects not only the time message Zn–1 that is present but also its actual reception time u. Furthermore, in the next processing step 36ab, the time message Zn–1 is decoded and reconstructed in such a way that at least the value of the transmission time x contained in it for a previous time message Zn–2 is recovered. The local synchronization algorithm 37 is started by the next processing step 66 at the action time 37a. First of all, in a processing step 37aa, this algorithm stores the reception time u associated with the time message Zn–1, for later processing. In the next processing step 37ab, a measured value for the time discrepancy between the central timebase and the local timebase is determined from associated transmission and reception times for a time message.

In the illustrated example, the time discrepancy x-s is formed from the transmission time x and the temporarily stored reception time s of the time message Zn–2. In the timing diagram shown in FIG. 2, this time message was transmitted before the time message Zn–1, and is thus no longer shown at the upper edge of the illustration, in order to make the illustration clearer. A correction value for synchronization of the local timebase tn can be determined from this time discrepancy x-s, and activated. This will be explained in more detail in the following.

A first sequence of associated processing steps at the local data processing apparatus 15 end is completed by this processing step. The lower part of FIG. 4 likewise shows two further cycles of processing steps, in an analogous way to the contents of FIG. 2, which relate to the determination and processing of the time discrepancies u-y and v-z resulting from the evaluation of the time messages Zn–1 and Zn. These sequences correspond to the previously explained sequence of processing steps, so that reference can be made to what has been said above with regard to their more detailed description.

According to a further, advantageous embodiment of the invention, a local timebase in a local data processing apparatus determines and stores time discrepancies from the time messages transmitted during an observation period. A predetermined number of transmissions of time messages are in this case advantageously combined to form an observation period. The transmission and evaluation of a time message from an observation period is also referred to in the following text as an observation step. The minimum value occurring in each case is determined from the accumulated time discrepancies detected in the observation period, and is used to form a correction value for use for synchronization. As already mentioned above, a minimum value from a group of time discrepancies is particularly suitable for forming a correction value, since the dispatch, the transmission and the reception of time messages linked to it have the smallest time difference from the central timebase. This will be explained further in the following text using the example in FIG. 5.

Figure 5:
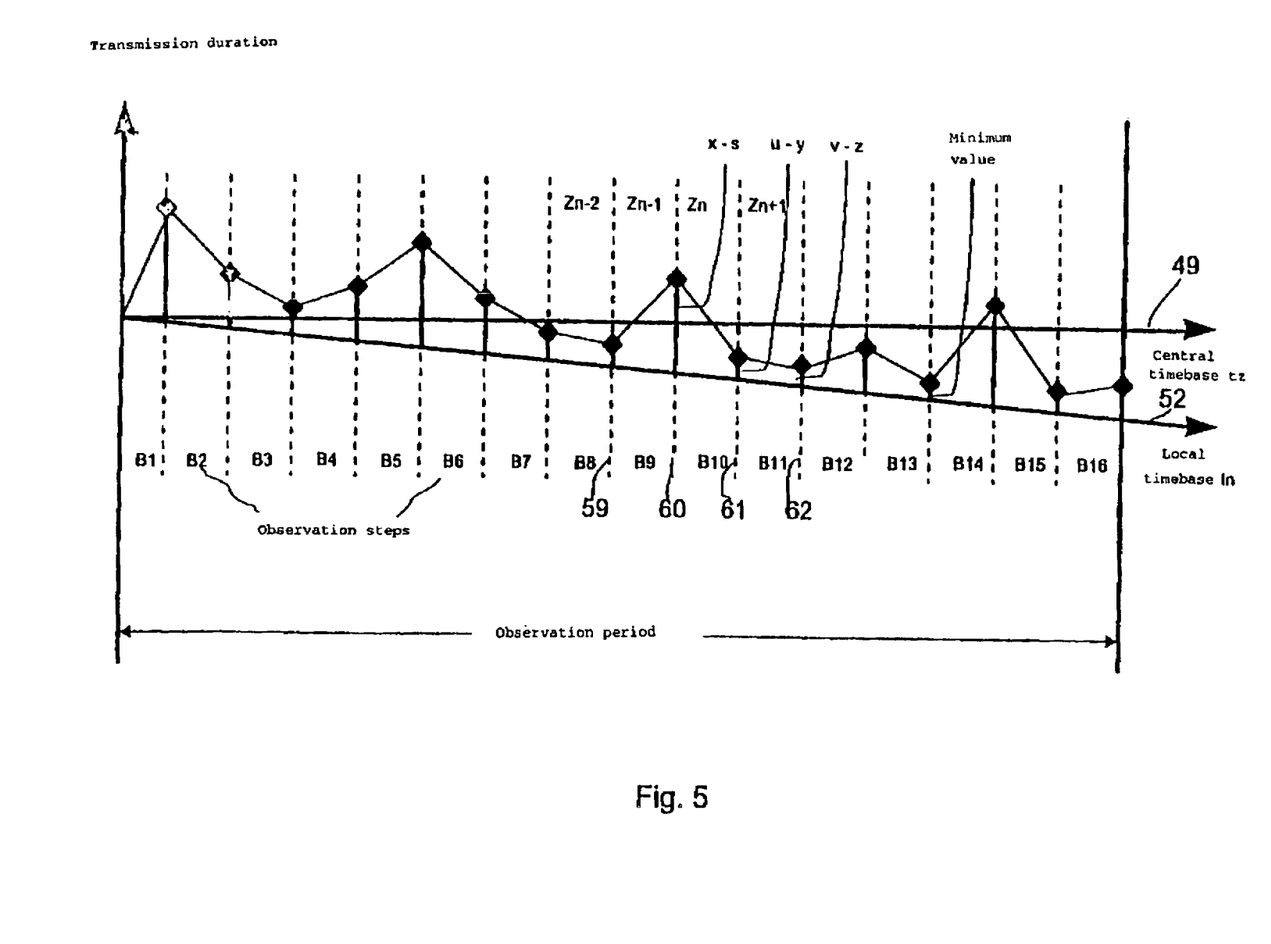
FIG. 5 shows an example of the determination of a minimum value from the time discrepancies detected during an observation period, according to one advantageous development of the invention.

By way of example, FIG. 5 shows an observation period which has 15 observation steps, B1 to B16. In FIG. 5 there are two time axes, a first time axis 49 for the central timebase tz and a second time axis 52 for the local timebase tn. The oblique position of the time axis for tn with respect to the time axis for tz shows the discrepancy, or the drift, between the local timebase and the central timebase, which makes regular synchronization of the local timebase necessary. The time axes 49, 52 in FIG. 5 correspond to those in FIG. 2. Furthermore, the respective time markers which are each indicated by a diamond at the end of each observation step in FIG. 5 correspond to the time markers on the right-hand, vertical time axis 49 in FIG. 2. This is made clear in FIG. 5 by the reference symbols 59, 60, 61 and 62. By way of example, the time messages Zn-2, Zn-1, Zn and Zn+1, respectively, are transmitted during the observation periods B8, B9, B10 and B11, respectively. In consequence, the value of the time discrepancy x-s, u-y or v-z, respectively, is in each case available at the end, for example, of the observation step B9, B10 or B11, respectively, i.e at the time markers 60, 61 or 62, respectively. The value is that which has been obtained by evaluation of the time message Zn-2, Zn-1 and Zn, respectively. In the example in FIG. 5, the minimum value of the time discrepancies in the illustrated observation period occurs, for example, at the end of the observation step B13. Its advantageous further processing to form a correction value for synchronization will be explained further using the example in FIG. 6.

Figure 6:
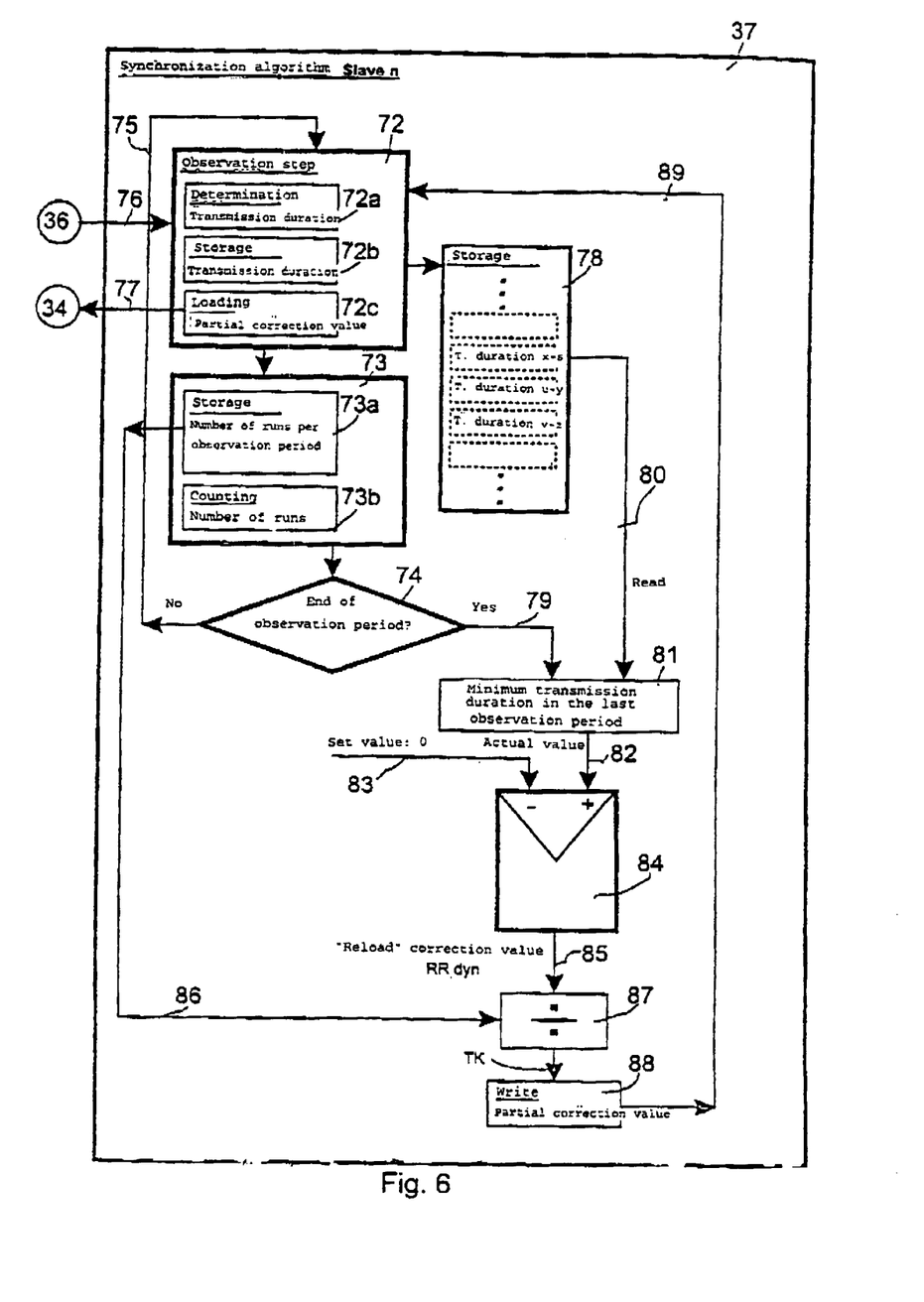
FIG. 6 shows, schematically, an exemplary embodiment of the invention for determining and applying a correction value, derived from the time discrepancies, for the local timebase in a local data processing apparatus.

FIG. 6 shows, schematically, an exemplary embodiment of a local synchronization algorithm in a local data processing apparatus in the form of a block diagram. Such an embodiment allows the determination and application of a correction value for the local timebase using the minimum value of the time discrepancies from the time messages transmitted and evaluated within an observation period. In the illustration in FIG. 6, reference is in this case made, to assist understanding, to the block diagram in FIG. 1 and the local synchronization algorithm 37, which is contained in the local data processing apparatus 15 "slave n" there.

In this case, the processing steps of the synchronization algorithm 37 illustrated symbolically in the blocks 72, 73 and 74 in FIG. 6 relate to one observation step in one observation period, and are run through once again in each observation step in the observation period.

In block 72, a first processing step 72a is used to determine the value of a time discrepancy, with the transmission time (which is transmitted with the present time message) of a previous time message being checked by means of a request 76 from the associated communication algorithm 36, and being processed by subtraction from the stored, associated reception time to form the value of a time discrepancy. The next processing step 72b is used to store this. A memory area 78 is illustrated symbolically in FIG. 6, for this purpose, in whose cells the already explained time discrepancies x-s, u-y, v-z are entered, by way of example. The further processing step 72c, whose object is to load a partial correction value, will be explained in the following text.

This is followed by a block 73 with the processing steps 73 and 73b. In this case, the object of the processing step 73a is to store a preset value, namely the number of observation steps per observation period, which also corresponds to the number of runs of the synchronization algorithm 37 through the blocks 72, 73 and 74. The number of runs which have already taken place through these blocks are counted in the next processing step 73b. In the following program branch 74, the preset value from 73a is compared with the present numerical value from 73b to decide whether all the observation steps in an observation period have been processed. Thus, the comparison determines whether the end of the observation period has been reached, or whether there are still any observation steps to be processed. In the first case, the algorithm leaves the processing loop comprising the blocks 72, 73 and 74 and jumps via the branch 79 to the block 81. In the second case, it jumps back via the branch 75 to the start of the processing loop, and the processing of the blocks 72, 73 and 74 is repeated for the next observation step.

After processing all the observation steps in an observation period, the present value of the minimum time discrepancy in the most recent observation period is determined in the block 81, in which access is made to the values contained in the memory area 78. According to a particularly advantageous embodiment of the invention, which has already been illustrated in the example in FIG. 6, this minimum value can now be processed further with the aid of a control algorithm 84 in the local synchronization algorithm 37, as far as the actual correction value RR dyn, which is emitted as the output value 85 from the control algorithm 84. The control algorithm 84 advantageously includes a proportional element and, possibly, an integrating or differentiating element as well. Furthermore, the control algorithm 84 is supplied with the value zero as the set value 83 and with the minimum value of the time discrepancies from a previous observation period as the actual value 82.

According to a further embodiment of the invention, a correction value which has been determined by evaluating the observation steps in a completed observation period can be applied in a distributed manner to a local timebase during a subsequent observation period. For this purpose, a partial correction value is advantageously formed in the relevant local timebase by dividing a correction value by the predetermined number of time messages transmitted in each observation period, and a partial correction value is then applied to the local timebase for synchronization, for each transmission of a time message, i.e for each observation step. The correction value is that not applied in one step, but in stages and extended over a period of time.

One advantageous embodiment which is suitable for this purpose has likewise already been illustrated in the example in FIG. 6. To this end, the local synchronization algorithm 37 includes a block 87 which divides the correction value RR dyn at the output 85 of the control algorithm 84 by the number of observation steps which have been read via the branch 86 from the processing step 73a. The partial correction value TK formed in this way can be applied to the local timebase in order to synchronize said local timebase for each transmission of a time message. In the example in FIG. 6, a write process for the partial correction value TK is carried out by the block 88 in the synchronization algorithm 37, in which process this partial correction value TK is entered via the branch 89 in the processing step 73b in block 72. If the algorithm now once again runs cyclically through the processing loop comprising the blocks 72, 73 and 74 in order to process the observation steps in a current observation period, then a partial correction value is applied to the local timebase for each run. After carrying out the intended number of runs, the sum of all the partial correction values, that is to say the total correction value, is applied, so to speak, "softly".

The application of a correction value is once again advantageously carried out using the local units, illustrated by way of example in FIG. 1, for forming a local timebase tn. These unit includes a timer module 34 which is decremented cyclically by a clock 35, and emits a timing signal for the local timebase tn once a previously loaded start value has been completely decremented. For synchronization, the local synchronization means, in particular the associated synchronization algorithm 37, apply the correction value RR dyn to the timer module 34 as a new start value. If, as described above, the correction value is split into partial correction values TK, then these are applied to the timer module 34 in a subsequent observation period, preferably in time with the reception of the time messages, and for each observation step. In the example shown in FIG. 6, this is symbolized by a branch 77 which originates from the processing step 72c and jumps to the timer module 34.

What is claimed is:

1. A method for synchronization of at least one local timebase in a local technical system to a central timebase in a central technical system, with time messages being transmitted from the central timebase to the local timebase, comprising:
   detecting the transmission time of a time message by the central timebase and entering the detected transmission time as a data value in a subsequent time message;
   detecting the reception time of a time message, and reproducing the value of the transmission time contained in a subsequent time message by the local timebase;
   determining time discrepancies between the local timebase and the central timebase by the local timebase, from a difference between associated transmission and reception times of time messages; and
   evaluating values of the time discrepancies by the local timebase, for synchronization of the local timebase, and determining correction values for the local timebase therefrom.

2. The method as claimed in claim 1, further comprising:
   determining time discrepancies by the local timebase in conjunction with a group of time messages transmitted during an observation period; and
   forming a correction value by the local timebase from a minimum value of the time discrepancies determined in an observation period, and using the correction value for synchronization.

3. The method as claimed in claim 2, wherein the correction value corresponds to an initial value of a control algorithm, to which a value zero is supplied as a set value, and to which the minimum value of the time discrepancies determined during an observation period is supplied as an actual value when forming the correction value.

4. The method as claimed in claim 3, wherein the correction value is applied in a distributed manner to a local timebase during a subsequent observation period.

5. The method as claimed in claim 3, wherein the observation period includes a predetermined number of transmitted time messages, further comprising the steps of:
   forming a partial correction value by division of the correction value by the predetermined number of transmitted time messages, and
   applying the partial correction value to the local timebase for synchronization for each transmission of a time message.

6. The method as claimed in claim 4, wherein the observation period includes a predetermined number of transmitted time messages, further comprising the steps of:
   forming a partial correction value by division of the correction value by the predetermined number of transmitted time messages, and
   applying the partial correction value to the local timebase for synchronization for each transmission of a time message.

7. The method as claimed in claim 2, wherein the correction value is applied in a distributed manner to a local timebase during a subsequent observation period.

8. The method as claimed in claim 7, wherein the observation period includes a predetermined number of transmitted time messages, further comprising the steps of:
   forming a partial correction value by division of the correction value by the predetermined number of transmitted time messages, and applying the partial correction value to the local timebase for synchronization for each transmission of a time message.

9. The method as claimed in claim 2, wherein the observation period includes a predetermined number of transmitted time messages, further comprising the steps of:
   forming a partial correction value by division of the correction value by the predetermined number of transmitted time messages, and
   applying the partial correction value to the local timebase for synchronization for each transmission of a time message.

10. An apparatus comprising:
    a central data processing device for forming a central timebase;
    central communication means for supplying time messages to a data bus;
    central synchronization means for detecting the transmission time of a supplied time message and for entering it in a subsequent time message before being supplied as a data value, and including at least one local data processing device, the at least one local data processing device including,
    local means for forming a local timebase,
    local communication means for receiving time messages from the data bus, and
    local synchronization means for detecting the reception times of the received time messages, for reading the transmission times contained in the received time messages, for determining time discrepancies between the local and the central timebase from associated transmission and reception times, and for determining a correction value for the local means from the determined time discrepancies in order to produce the local timebase.

11. The apparatus as claimed in claim 10, wherein
the local means each include a timer module in order to form a local timebase, the timer module being decremented cyclically by a clock and, after complete decrementation of a start value, emitting a timing signal for the local timebase;

wherein local synchronization means applies the correction value to the respective timer module as the start value.

12. The apparatus as claimed in claim 11, wherein the local synchronization means, forms the correction value from the time messages received in an observation period.

splits the correction value into partial correction values, and applies these partial correction values to the timer module in a subsequent observation period.

13. The apparatus of claim 12, wherein the partial correction values are applied in time with the reception of time messages.

14. The apparatus as claimed in claim 10, wherein the local synchronization means, forms the correction value from the time messages received in an observation period, splits the correction value into partial correction values, and applies these partial correction values to the timer module in a subsequent observation period.

15. The apparatus of claim 14, wherein the partial correction values are applied in time with the reception of time messages.

16. An apparatus, for use in a production facility, comprising the apparatus of claim 10, wherein the production facility includes a local data processing device which actuates local technical equipment in time with the respective local timebase.

17. The apparatus for use in a production facility as set forth in claim 16, wherein the production facility includes electrical drives as the technical equipment.

18. The apparatus of claim 17, wherein the local data processing device interchanges control variables, with the associated local technical equipment, in synchronism with the respective local timebase.

19. The apparatus of claim 16 wherein the local data processing device interchanges control variables with the associated local technical equipment, in synchronism with the respective local timebase.

\* \* \* \* \*